UNITED STATES PATENT OFFICE.

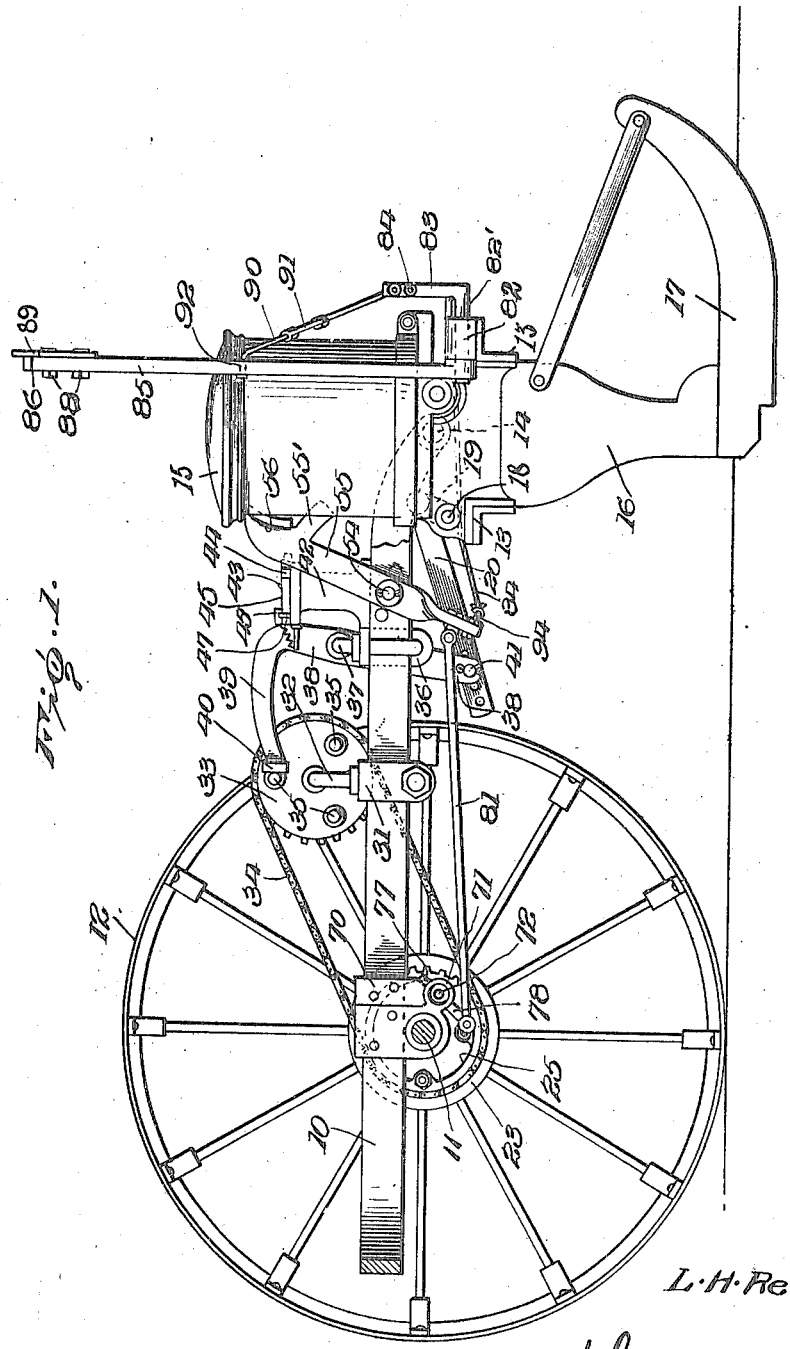

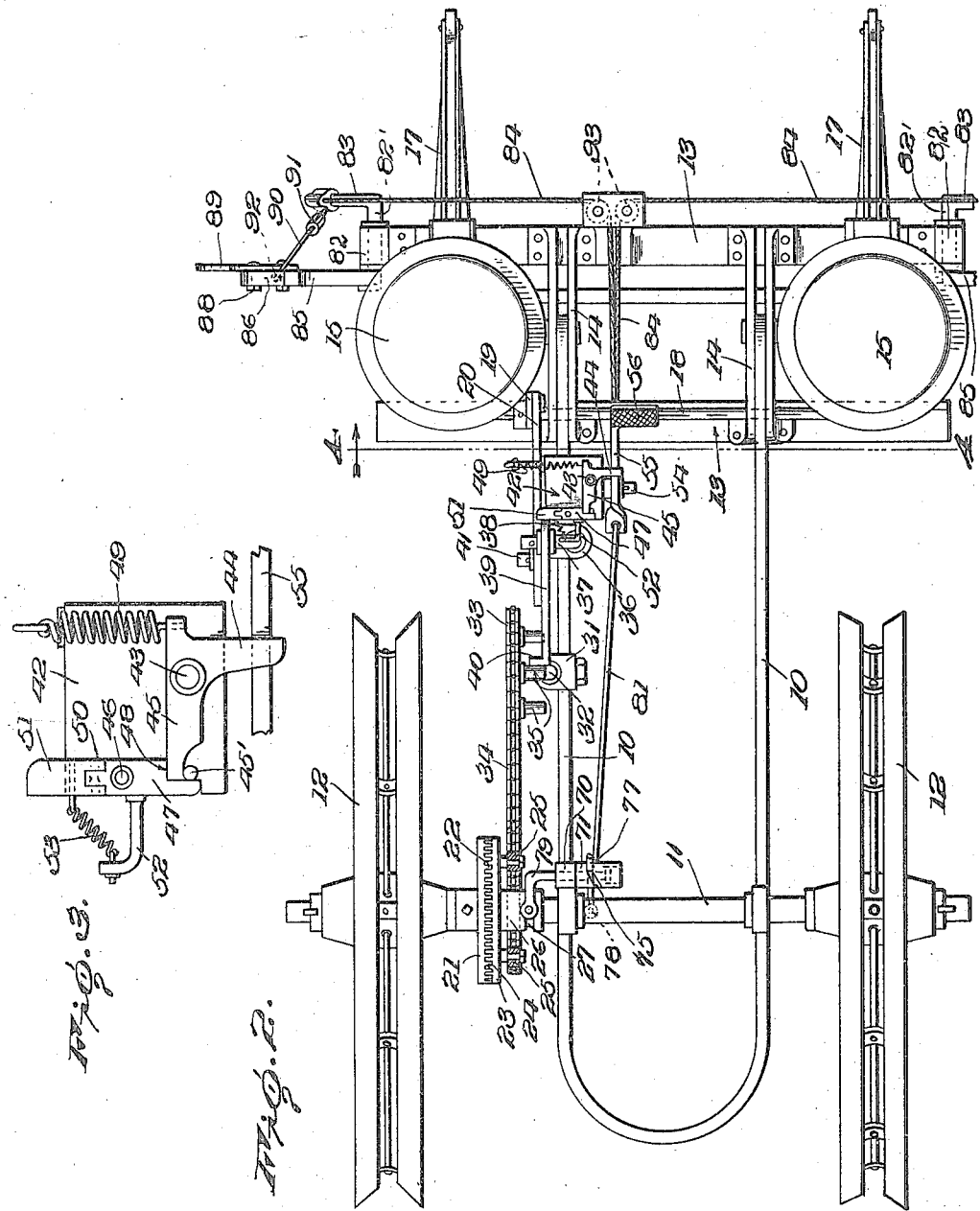

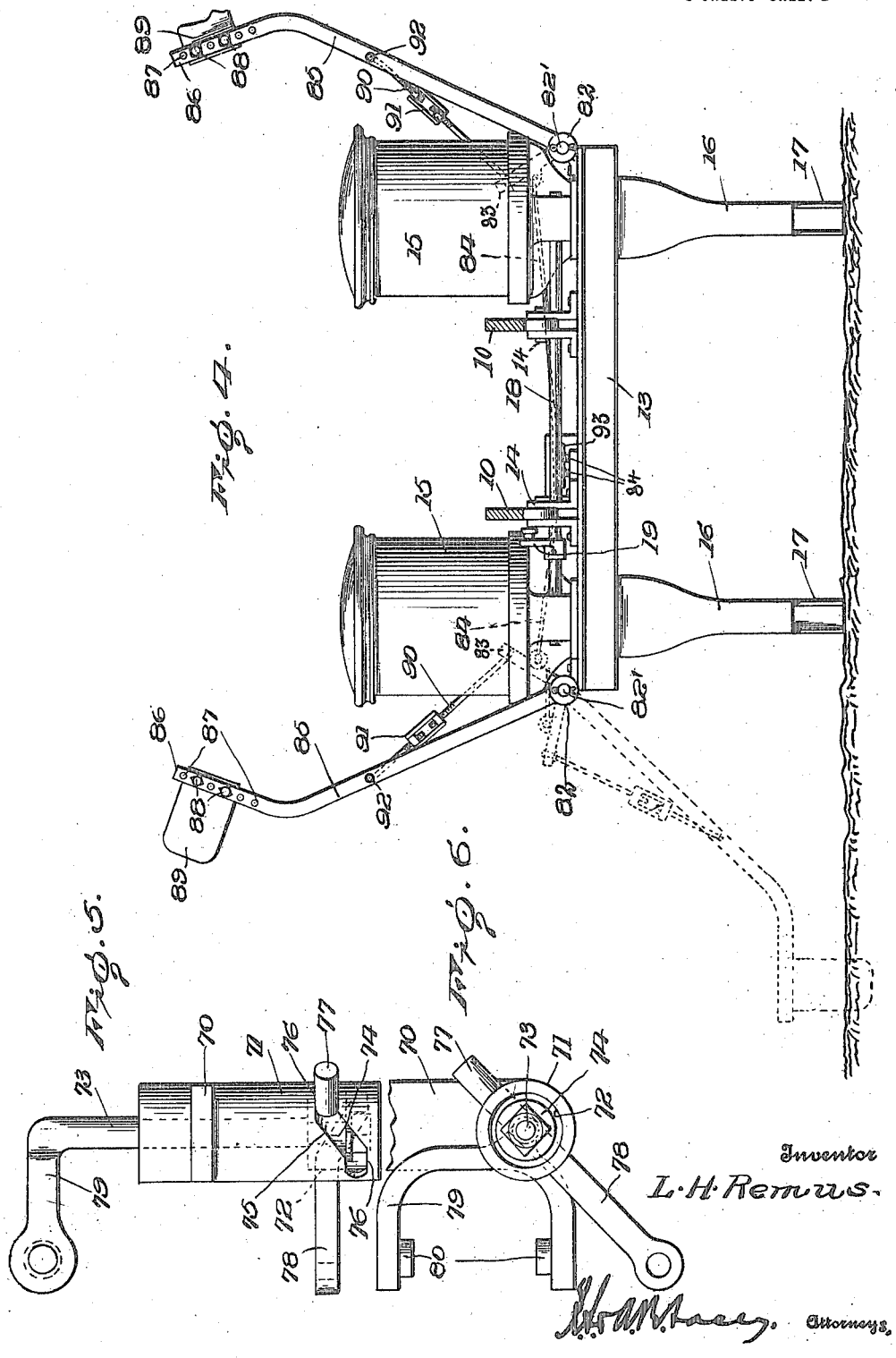

LUDWIG H. REMUS, OF ADRIAN, MICHIGAN.

ATTACHMENT FOR CORN-PLANTERS.

1,257,928.　　　　Specification of Letters Patent.　　Patented Feb. 26, 1918.

Application filed May 2, 1917.　Serial No. 165,952.

*To all whom it may concern:*

Be it known that I, LUDWIG H. REMUS, a citizen of the United States, residing at Adrian, in the county of Lenawee and State of Michigan, have invented certain new and useful Improvements in Attachments for Corn-Planters, of which the following is a specification.

This invention relates to improvements in seed planters, more particularly for devices for planting corn in hills, and has for one of its objects to improve the construction and increase the efficiency and utility, and to provide means whereby the corn may be planted in hills at equal distances apart and without the necessity for employing check row devices of wire and the like.

Another object of the invention is to provide a device of this character which may be applied without material structural change to seed planters of various forms, and which may be readily attached and detached without changing the ordinary seed or dropping devices of the planter.

Another object of the invention is to provide a device whereby the planting of the corn may be expedited and time and labor saved.

With these and other objects in view, the invention consists in certain novel features of construction, as hereinafter shown and described and then specifically pointed out in the claims; and in the drawings illustrative of the preferred embodiment of the invention—

Figure 1 is a side elevation of the improved device attached to a conventional seeding machine with a portion of the frame in section;

Fig. 2 is a plan view of the parts shown in Fig. 1;

Fig. 3 is an enlarged detail of the tripping devices;

Fig. 4 is an elevation of the forward portion of the seeding machine with the frame work in section on the line 4—4 of Fig. 2 looking in the direction of the arrow, with the marker devices attached, illustrating their construction;

Fig. 5 is an enlarged detached detail view of the clutch operating mechanism.

Fig. 6 is an end elevation of the parts shown in Fig. 5.

Corresponding and like parts are referred to in the following description and indicated in all the views of the drawing by the same reference characters.

For the purpose of illustration the improved device is shown applied to a conventional seeding machine arranged to drop corn or like seeds to form hills at uniform distances apart, and in rows of hills likewise spaced at uniform distances apart, and comprises a supporting frame represented as a whole at 10, a main driving axle 11, bearing wheels at 12, a seed box supporting frame at 13 coupled as indicated at 14 to the frame 10 and carrying seed boxes 15, seed tubes or conductors 16, and the shoes or runners at 17. Devices of this character are provided with suitable seed dropping mechanism whereby a certain predetermined number of seeds are dropped into the conductor tube 16 at stated intervals to form the hills, and these dropping mechanisms usually include an oscillating rod or rock shaft represented at 18. In the improved device the rock shaft 18 is provided with an operating arm 19 to which an operating rod or bar 20 is connected.

Mounted for rotation upon the axle 11 is a disk 21 having relatively fine or small radiating teeth 22, and mounted to rotate with the axle 11 is an opposing clutch disk 23 having correspondingly fine or relatively small clutch teeth 24, the teeth coacting when the clutch devices are disposed in face contact to engage and cause the disks to rotate in concert. Attached to the clutch disk member 23 is a chain wheel 25, the chain wheel and disk member 22 thus rotating together upon the axle. The hub 26 of the clutch disk 21 is provided with an annular channel 27 with which a shipper device engages.

Attached at 70 to one of the frame members 10 is a bearing 71, the bearing being disposed transversely of the frame members and in parallel relation to the axle 11. The bearing 71 is provided with a recess or socket indicated at 72 within its inner end, and slidably disposed through the bearing is a rod 73 extending into the socket 72, and mounted for rotation upon the extended portion of the rod is a head or collar member 74. Formed through the side walls of the cavity 72 are obliquely directed slots, represented at 75. The terminals of the slots are extended circumferentially of the bearing for a short distance, as represented at 76. Extending from one side of the member 74 is a stop member 77 which projects through one of the oblique slots 75, and extending from the diametrically opposite side of the member 74 is an arm 78 which extends through the other obliquely directed slot. The member 74 is mounted for rotation upon the rod 73, and extending from the opposite end of the rod 73 is a yoke device 79 provided with inwardly directed lugs 80 which engage in the annular channel 27 of the hub 26. At its free end the arm 78 is provided with an operating rod 81. By this arrangement it will be obvious that when the rod 81 is moved longitudinally in one direction the arm 78 will cause the members 74 to oscillate within the recess 72 and the members 77—78 coacting with the oblique slots 75 will cause the member 74 to move longitudinally of the bearing and carry the member 73 with it and thus cause the hub 26 together with the clutch member 21 to be moved away from the clutch member 23 or disconnect the clutch, and then when the rod 81 is moved in the opposite direction the movement will be reversed or the clutch members united, as hereafter more fully explained.

Attached to the frame 10 is a bracket device 31 in which a stub shaft 32 is supported and directed outwardly away from the frame 10 and provided with a chain wheel 33 over which a chain 34 leads from the chain wheel 25. Projecting from the chain wheel 33 are a plurality of pins 35. Any required number of the pins may be employed but generally three will be used, as shown.

Mounted upon the frame 10 is another bracket device 36 similar to the bracket device 31 and carrying a stub shaft 37. Mounted to swing upon the stub shaft 37 is a lever arm 38 having a rearward extension 39 terminating in a lateral off-set 40 which extends into the paths of the pins 35.

At its lower end the member 38 is pivotally connected at 41 to the operating rod 20. By this arrangement it will be obvious that when the seeder is moved forwardly the rotary motion of the bearing wheels 12 will be communicated from the clutch device 22—23 to the chain 34 and cause the pins 35 to consecutively engage the offset 40 of the lever arm 38—39 and thus cause the rod 20 to actuate the dropper mechanism.

By providing a plurality of the pins 35 and spacing them at proper distances apart the dropper mechanism will be caused to operate a number of times at each revolution of the carrier wheels 12, and by properly calculating the size of the sprocket wheels and the number of the pins 35, the dropper mechanism may be caused to operate at proper intervals to correspond to the distance apart of the hills.

The hills are generally spaced about three and one half feet apart, and the various devices will be so proportioned that the dropper mechanism will be actuated once in every three and one-half feet of the forward movement of the seeding machine.

Connected to the frame 10 is another bracket device 42, and pivoted at 43 upon this bracket is a small bell-crank trip lever including arms 44—45, the arm 44 extending laterally of the frame 10 while the arm 45 extends longitudinally of the frame, or rearwardly thereof. Pivoted at 46 upon the bracket 42 is a trip latch 47 having a notch 48 in one end in which the rearward end of the portion 45 of the bell crank trip lever engages when the member 47 is in one position, as illustrated more fully in Fig. 3. A spring 49 is connected to the bracket 42 and engages the bell crank lever and operates to hold the latter yieldably in one position and in engagement with a stop pin 45' extending from the member 42. Pivoted at 50 to the trip latch is a swinging extension 51 which extends into the path of the lever arm 38—39 when in downward position and will be maintained out of the path of the trip lever when in upward position. Extending from the bracket 42 is a rod 52, and connected to the member 51 and likewise to the rod 52 is a spring 53. The rod 52 is so located that the spring exerts a pulling force upon the swinging member 51 and holds the latter either in elevated or depressed position. Thus when the member 51 is disposed in its vertical position or out of the path of the lever 38—39, the spring 53 exerts its force to yieldably hold the member 51 in that position, and then when the member 51 is forcibly turned into its horizontal position or into the path of the member 38—39, the spring operates to yieldably hold the member 51 in the latter position, the object to be hereafter explained.

Pivoted at 54 to the bracket 42 is a lever arm 55 having a foot rest 56 at its upper end and extended at its lower end below the line of the frame 10. The member 55 extends into the path of the arm 44 of the bell crank trip lever which operates to hold the member 55 positively in its forward position when the trip latch 47 is in its locked relation relatively to the portion 45 of the trip lever. Extending from the lever member 55 is a curved extension 55' against which the free end of the portion 44 of the bell crank trip lever engages when the member 55 is moved into its rearward position, which will occur when the trip latch 47 is disengaged from the portion 45 of the bell crank trip lever, and thus prevent the portion 44 of the latter from passing in advance of the lever member 55. By this means the extension 55' of the lever 55 when moved into its rearward position will hold the bell crank trip lever 44—45 in its withdrawn position and out of engagement with the trip latch 47.

Mounted upon the frame work 13 at each end are swinging marking devices, and as these marking devices are precisely alike except that they are rights and lefts, the description of one will suffice for both. Each marking device comprises a bearing 82 in which a relatively short stub shaft 82' is mounted for rotation. At one end the shaft 82' is extended into an arm 83 to which a pull cable 84 is connected. Upon the opposite end of the shaft 82 a bar 85 is swingingly mounted, the bar being bent at its outer portion obliquely to its longitudinal plane as shown at 86, the oblique portion 86 having a plurality of apertures 87 to receive holding bolts or like fastening devices 88 by which a marker blade 89 is adjustably coupled thereto. By this means the member 89 may be adjusted nearer to or farther from the shaft 82. The connecting point of the pull member 84 is disposed intermediate the arm 83, and connected near its outer end is a rod 90 formed in two portions connected by a turn buckle 91, so that the portions of the rod may be adjusted toward or away from each other to increase or decrease its length. The rod 90 is pivoted at 92 to the bar 85, as shown. By this means it will be obvious that when the pull member 84 is actuated the member 85 and its attachments will be elevated or depressed.

The pull members 84 are carried over guide pulleys 93 and thence to the lower end of the member 55 to which they are attached, as shown at 94. When the member 55 is disposed in its forward position as shown in Figs. 1 and 2, the pull members 84 will be drawn rearwardly and hold the members 85 and their attachments in their elevated position, as shown in full lines in Fig. 4, and when the member 55 is released by the operation of the trip member 47 as before described, the weight of the members 85 and their attachments will be sufficient to overcome the inertia of the spring 49 which is relatively light, and drop into the position shown by dotted lines at the left in Fig. 4 and cause the marker devices 89 to form a cavity in the earth, and thus indicate the starting point of the next row of hills to be planted, as hereafter more fully explained. By providing the holding member 90 with the adjusting turn buckle 91 the "throw" or movement of the member 85 may be controlled and increased or decreased as may be required. The members 89 may likewise be adjusted longitudinally of the bars 85 by means of the bolt apertures 87, before described, to enable the distance between the rows to be planted, to be increased or decreased as required.

The distances between the center of the dropper devices and the marker devices 89 correspond to the distance between the centers of the rows of the corn or other seed to be planted, and the members 89 are necessarily adjusted to correspond to the distance between the centers of the seed tubes 16.

When starting to plant, the foot lever 55 is disposed in its forward position, as shown in Fig. 1, thus elevating the marker devices and likewise moving the shipper member 78 into its rearward position as shown in Figs. 1 and 2 and disposing the clutch device 22—23 in locked or closed position and causing the axle 11 to rotate the member 33 through the coaction of the wheel 25 and chain 34 and thus cause the pins 35 to intermittently operate the lever device 38—39 and correspondingly operate the dropper mechanism. It will be understood that at this stage of the operation the small trip latch 51 is in its elevated position so that the movement of the member 38—39 does not effect the trip mechanism 44—45. Thus during the planting operation the member 55 is maintained in its forward position and holds the marker devices in inoperative position. When the end of the row is reached and it is required to reverse the position of the seeding mechanism to travel back across the field, the driver uses the toe portion of his left foot to push the member 51 into its horizontal position against the resistance of the spring 53 and thus moves the member 51 into the path of the member 38—39, so that at the next movement of the latter the latch device 47 will be actuated to disconnect the shoulder 48 from the portion 45 of the bell crank lever. This movement releases the member 55 and permits the bars 85 to fall by gravity against the resistance of the spring 49 and causes the marker devices 89 to form an indicating cavity in the ground to denote the starting point of the next row to be planted. When moving in one direction one of the marker devices remains idle, or makes its indicating cavity in line with a row previously planted, but this does no harm, while the other previously idle marker device becomes active, and so on over the whole field.

The projection 55' on the member 55 prevents the terminal of the portion 44 of the bell crank trip lever from passing in front of the member 55, hence when the machine has been turned and is ready to start on the return trip, the driver forces the member 55 forwardly by the pressure of the foot on the treadle 56 and thus elevates the marker devices into their former inoperative position and at the same time moves the clutch operating mechanism to couple the axle to the moving portions. The driver at the same time elevates the member 51 into its former vertical position and out of the path of the lever 38—39. The seeding operation is then continued as before, and when the end of the field is reached the marking operation is repeated and so on continuously.

The various devices comprising the improvement may be readily applied without material structural change to corn planters of the various makes.

Having thus described the invention, what is claimed as new is:

1. An attachment for a seeding machine comprising a clutch device adapted to be associated with the axle thereof, and including a rotative member, manually actuated means adapted to be mounted upon the frame of the seeding machine, connecting means between said manually operated means and the clutch device, operating means adapted to be associated with the dropping device of the seeding machine, a rotative member, means for transmitting the motion of said clutch device to said rotative member, means for intermittently transmitting the motion of said rotative member to said seed dropper operating means, and manually actuated means for coupling the intermittent motion transmitting means with the seed operating means.

2. An attachment for a seeding machine comprising a clutch device adapted to be associated with the axle thereof, manually actuated means adapted to be mounted upon the frame of the seeding machine, a marker device adapted to be swingingly coupled to the seeding machine, connecting means between said manually operated means and the clutch device, connecting means between the manually operated means and the marker device, operating means adapted to be associated with the dropping devices of the seeding machine, and means adapted to be operated by said clutch device for intermittently actuating said dropper operating means.

3. An attachment for seeding machines comprising a member adapted to be mounted for rotation upon the frame thereof and having a plurality of laterally directed pins, means for transmitting the motion of the axle of the seeding machine to the rotative member, an arm operative intermittently by said pins, a lever device mounted to swing, a locking device extending into the path of the said lever device, a latch device engaging said locking device, a trip member swinging upon said latch device and extending when in one position into the path of said pin operating arm, and means associated with said lever device adapted to operate the seed dropping device of said seeding machines.

4. An attachment for seeding machines comprising a motion imparting means adapted to be associated with the axle thereof, manually actuated means adapted to be mounted upon the frame of a seeding machine, connecting means between said manually operated means and the motion imparting means, operating means adapted to be associated with the seed dropping devices of the seeding machine, means operative by said motion imparting means for intermittently actuating said dropper operating means, marker devices adapted to be movably connected to said seeding machine, connecting means between said marker devices and said manually actuated means, a trip device holding said manually operated means, means operative by said intermittently actuated means for causing the operation of said trip device to release the manually operated means and cause the marker devices to simultaneously move into operative position and disconnect the motion imparting means.

5. An attachment for seeding machines comprising a motion imparting means, manually actuated means, connecting means between said manually operated means and the motion imparting means, operating means adapted to be associated with the seed dropping devices of the seeding machine, means operative by said motion imparting means for intermittently actuating said dropper operating means, marker devices, connecting means between said marker devices and said manually actuated means, a trip device holding said manually operated means, means operative by said intermittently actuated means for causing the operation of said trip device to release the manually operated means and cause the marker devices to simultaneously move into operative position and disconnect the motion imparting means.

In testimony whereof I affix my signature.

LUDWIG H. REMUS. [L. s.]

Copies of this patent may be obtained for five cents each, by addressing the "Commissioner of Patents, Washington, D. C."